Oct. 9, 1951  R. A. WOLF  2,570,899
METHOD OF BURNING-OFF HOLLOW GLASSWARE
Filed July 9, 1949
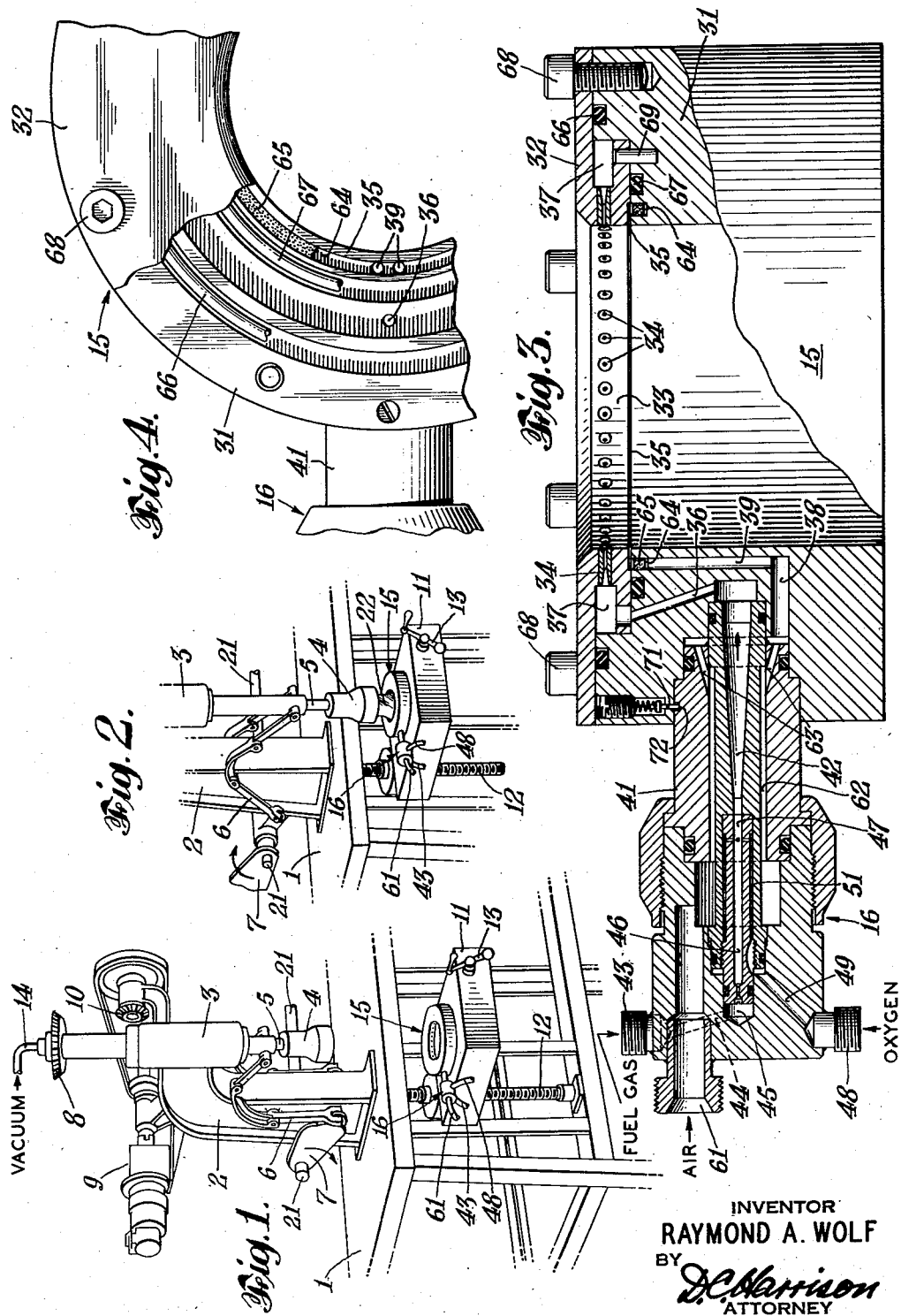
INVENTOR
RAYMOND A. WOLF
BY
D.C. Harrison
ATTORNEY Patented Oct. 9, 1951

2,570,899

UNITED STATES PATENT OFFICE 2,570,899

METHOD OF BURNING OFF HOLLOW GLASSWARE

Raymond Albert Wolf, Maplewood, N. J., assignor, by mesne assignments, to Union Carbide and Carbon Corporation, a corporation of New York Application July 9, 1949, Serial No. 103,825

5 Claims. (Cl. 49—77)

My invention relates to a method of severing the waste material or moil from glass tumblers or other hollow glassware by a burn-off operation wherein a flame is applied to a work piece in a localized region extending around the work piece. More particularly, my invention is an improvement over methods in which stretching of the softened glass is employed with the aim of controlling the formation and size of the bead that forms along the rim of the ware, and of avoiding the formation of boiling, lumps, tears or excessive bead or other defects occurring on the rim or edge due to poor separation of the moil.

I have discovered that these defects can be cured or avoided and the size of the bead controlled, or the bead virtually eliminated, if desired, by directing against the softened glass of the moil, a blast of cooling fluid during the severing operation. For the purposes of this invention it is essential that the blast of cooling fluid be applied against the softened glass of the moil— that is, on the moil side of the flame—in a localized region extending horizontally around the moil immediately adjacent the region where the severing flame is applied to the work piece, and that the flame and the cooling fluid and the stretching of the softened glass be continued simultaneously until severance of the moil occurs. Severance takes place between the flame and the cooling blast.

The cooling of the glass by the blast serves to decrease the viscosity of the softened glass on the moil side of the work piece and to restrict the attenuation of the wall, during stretching, to a much narrower region than heretofore. The ultimate result seems to be that the effects of irregularities of wall thickness on the drawing of the glass are minimized, and the formation of glass stringers which lap back on the ware and produce tear drops or bumps on the edge are prevented. Other advantages of the invention will appear from the further description which follows.

In the accompanying drawing

Fig. 1 is an elevation, in perspective, of one form of apparatus wherein my invention can be practiced and shows the relation of parts when the apparatus is in position to receive a work piece for a severing operation;

Fig. 2 is a similar elevation of the same apparatus illustrated in Fig. 1 showing the relation of parts after the work piece has been inserted and lowered into position for the burning-off operation;

Fig. 3 is a vertical sectional view, taken centrally, of my improved burner, together with an improved fuel mixer particularly adapted for use in carrying out my process; and Fig. 4 is a fragmentary plan view, partly in section, of the same burner shown in Fig. 3.

Referring more particularly to Figs. 1 and 2, the invention is illustrated in conjunction with a conventional burn-off machine, insofar as the main frame, the vacuum chuck and spindle, the spindle drive and spindle arm linkage are concerned. These conventional parts include a main frame 1, an upstanding bracket 2 affixed thereto, a spindle bearing assembly 3 carried by the bracket at its upper end, a vacuum chuck 4 and its supporting hollow spindle 5, a spindle arm linkage 6 actuated by timing cam 7, a driven bevel gear 8 affixed to the upper end of spindle 5, a drive mechanism 9 including bevel gear 10, an adjustable table 11, a table adjusting screw 12, a table adjustment handle 13 and vacuum shaft 14, connected to a vacuum pump, not shown.

The operation is as follows. Cam shaft 21, upon being rotated clockwise by a motor, not shown, brings cam 7 into contact with spindle arm linkage 6, which in turn raises spindle 5 with vacuum chuck 4 and disengages bevel gear 8 from bevel gear 10 of drive mechanism 9. As shown in Fig. 1, the vacuum chuck is in position for the insertion of the work piece. The suction exerted by the vacuum through vacuum shaft 14 and the hollow spindle serves to hold the work piece in the chuck.

Further clockwise rotation of shaft 21 carries cam 7 out of contact with the spindle arm linkage 6, as shown in Fig. 2, permitting vacuum chuck 4 and spindle 5 to drop to the position where it engages bevel gear 10 of the continuously operating drive mechanism 9, for rotation of vertically extending spindle 5, vacuum chuck 4 and work piece 22, all about a vertical axis.

Supported on table 11 is my new and improved annular burner 15 and my new and improved fuel mixer 16, which are shown in detail in Figs. 3 and 4. By means of table adjusting handle 13 and cooperating table adjusting screw 12, both of conventional construction, the table can be raised or lowered and the burner positioned relative to the rotating work piece for the burning-off of the moil. With the conventional type burner, as the flames impinge on the glass wall of the work piece and soften the glass, the weight of the moil draws or elongates the work piece with consequent attenuation of the glass wall. The drawing of the article and attenuation of the glass wall continue until severance of the moil takes place.

Referring to Figs. 3 and 4, my new and improved burner 15 comprises a burner base 31 suitably provided with passages and bores, a cover plate 32, and a burner ring 33 provided with a series of openings into which are inserted burner tips 34 for discharging jets of oxygen-fuel mixture to produce radial flames for heating a region or zone extending circumferentially around the work piece. Immediately below the burner tips 34, there is provided an annular slit or slot 35, between the burner base 31 and the burner ring 33, for passage of cooling fluid to impinge upon the softened glass of the work piece.

The oxygen-fuel mixture is supplied to the burner through the mixer 41 provided with a mixing and expanding chamber 42. Fuel gas, from a reservoir not shown, enters the mixer at fuel connection 43, and flows to the mixing chamber through drilled passage 44, intermediate chamber 45 and central bore 46, where it meets at a ring of openings with oxygen entering the mixer at oxygen connection 48 and flowing through drilled passage 49 and annular passage 51. The mixed and expanded fuel and oxygen then passes from the mixer 41 and through bore 36 of burner 15 into the annular distributing chamber 37, for distribution of the oxygen-fuel mixture to the burner tips 34.

As a matter of convenience, mixer 41 is employed also for conveying the cooling fluid into the burner base. The cooling fluid which, for illustrative purposes, is referred to here as air, enters the mixer under pressure at air connection 61 and flows by way of the annular passage 62, and bores 63 of the mixer, into the burner base whence it flows by bores 38 and 39 to the annular chamber 64, connected to slot or slit 35. A porous diffusor ring 65 is provided in the upper part of annular chamber 64 to assist in so distributing the flow that the air issues uniformly and evenly from slit 35 to impinge on the softened glass of the moil.

Ring seals 66 and 67 of a resilient material such as a silicon plastic are provided to seal off the various parts and prevent leakage or mixing of the cooling fluid and the oxygen-fuel mixture. The cover plate is fastened to the burner base by bolts 68, and dowel 69 is provided to insure proper positioning of the burner ring 33.

The mixer is readily inserted into the burner base and fastened therein against inadvertent removal by a slight turn which brings resiliently mounted pin 71 of the base into engagement with inclined groove 72 of the mixer. By turning the mixer a short distance in the opposite direction the pin is brought out of engagement with the groove and the mixer can be withdrawn.

My new and improved burner operates as follows. Upon the work piece being projected into the burner as shown in Fig. 2, both a flame and a blast of cooling fluid are applied to it, the flame being supplied by the oxygen-fuel mixture issuing radially inward from the burner tips 34 and the cooling fluid issuing inwardly from the slit 35. As the glass is softened and its viscosity decreased by the flame, the softened glass flows under the force exerted by the weight of the moil. At the same time the blast of cooling fluid, by cooling the softened glass, serves to increase its viscosity and accordingly its resistance to flow, in a circumferentially extending area which is below and immediately adjacent the flame. While not wishing to be bound by any particular theory or explanation for my improved results the principle seems to be that the application of the cooling fluid simultaneously with the flame confines the stretching or drawing of the glass, with concurrent attenuation of the wall, to a narrow circumferentially extending area lying between the flame and the cooling fluid. As a consequence the effects of variations in wall thickness are minimized and the defects which have heretofore resulted from permitting the stretching or drawing of the glass wall to be distributed over a more extended area are virtually eliminated. In the case of small glassware, such as tumblers, for instance, it has been possible to decrease the number of rejects for defective cut-off to less than one per cent.

Also, in accordance with my improved process, the size of the bead can be quite closely controlled according to the spacing between the cooling blast and the flame. For the purposes of this invention a heavy bead is considered to be one in which the glass at the rim extends beyond the wall by at least one-half the thickness of the wall. Beads larger than a heavy bead are regarded as excessive. In general, the less the spacing between the cooling blast and the flame, the smaller the bead. It is essential, however, that the spacing shall not be so close that the flame is distorted by the blast. For small ware, for instance, tumblers, it ordinarily will not be found practicable to space the blast more closely to the flame than one-sixteenth inch. Another factor to be taken into account in the spacing of the cooling blast from the flame is the distance of the flame from the work piece. This distance can vary according to the size of the work piece or the eccentricity of its rotation. In order to avoid distortion of the flame, the blast must also be spaced the farther from the flame, the farther the flame is from the work piece. Ordinarily, however, it will be found unnecessary to space the blast from the flame more than one inch. A spacing from one-sixteenth to one-half inch is preferred.

As cooling fluid there may be used oxygen, air, nitrogen, carbon dioxide, steam, water and the like. The use of oxygen-containing gas such as oxygen or air has the additional advantage of supplying secondary oxygen for the flame. When secondary oxygen for the flames is supplied by a cooling blast of air, an oxy-fuel gas ratio in the range of about 0.7:1 to 0.9:1 can be used, which affords a considerable saving over a ratio in the range of 1.1:1 to 1.5:1 otherwise required to maintain an oxidizing flame.

Instead of rotating the work piece as shown in Figs. 1 and 2, with the burner stationary, the work piece can be held stationary while the flame and, also, if desired, the blast are rotated around the work piece, employing rotary seals and other conventional expedients for supplying the fuel, oxygen and cooling fluid to the burner. Such variants are within the scope of my improved process wherein a cooling blast and a flame, in combination, are used simultaneously in burning-off operations.

Although my process is particularly well adapted for severing the moil from tumblers, it is not limited thereto. It is useful also for severing an unwanted portion or moil from such articles and objects of glass as television tubes, lamp shades, lamp chimneys, cigarette boxes, cylinders and the like, all comprehended by the term "hollow glassware," for the purposes of the present invention.

By the term "work piece" as used herein is meant the piece of hollow glass on which the burn-off operation is to be carried out and from which an unwanted portion or moil is to be severed. Other terms relating to burning-off operations and my improvements therein are used in accordance with the definitions and meanings set forth in "Glass Glossary" (reprinted from The American Ceramic Society Bulletin 27 (9) 353-62 (1948)) compiled and submitted by the Glass Division Committee on Classification, Nomenclature and Glossary, The American Ceramic Society, Columbus, Ohio.

What is claimed is:

1. In a method of burning-off hollow glassware wherein a flame is applied to a glass work piece, rotated about a substantially vertical axis, at a horizontally localized region extending circumferentially around the work piece to soften the glass in said region and the work piece is elongated vertically during the application of the flame to stretch the softened glass and diminish the thickness thereof, the improvement which consists in applying a blast of cooling fluid against the softened glass of the moil in a horizontally localized region extending circumferentially around the moil, immediately adjacent the region where the flame is applied to the work piece and spaced therefrom a distance such as not to distort the flame, to cool the softened glass of the moil and increase its resistance to flow, and continuing simultaneously to apply said flame and said blast of cooling fluid and to elongate said work piece until severance of the moil therefrom takes place between the region heated by the flame and the region cooled by the blast of cooling fluid.

2. In a method of burning-off hollow glassware wherein a flame is applied to a glass work piece, rotated about a substantially vertical axis, at a localized region extending horizontally and circumferentially around the work piece to soften the glass in said region, and the work piece is elongated vertically during the application of the flame to stretch the softened glass and diminish the thickness thereof, the improvement which consists in applying a blast of cooling fluid against the softened glass of the moil in a localized region extending horizontally and circumferentially around the moil, immediately adjacent the region where the flame is applied to the work piece and spaced therefrom a distance such as not to distort the flame, to cool the softened glass of the moil and increase its resistance to flow; elongating the work piece downwardly solely by the force of gravity acting on the moil, and continuing simultaneously to apply said flame and said blast of cooling fluid and to elongate said work piece solely by force of gravity acting on the moil until severance of the moil takes place between the region heated by the flame and the region cooled by the blast of cooling fluid.

3. In a method of burning-off hollow glassware wherein a flame is applied to a glass work piece, rotated about a substantially vertical axis, at a localized region extending horizontally and circumferentially around the work piece to soften the glass in said region, and the work piece is elongated vertically during the application of the flame to stretch the softened glass and diminish the thickness thereof, the improvement which consists in applying a blast of cooling fluid against the softened glass of the moil in a localized region extending horizontally and circumferentially around the moil, immediately adjacent the region where the flame is applied to the work piece and so spaced therefrom a distance from one-sixteenth to about one-half inch as not to distort the flame, to cool the softened glass of the moil and increase its resistance to flow; elongating the work piece downwardly solely by the force of gravity acting on the moil, and continuing simultaneously to apply said flame and said blast of cooling fluid and to elongate said work piece solely by force of gravity acting on the moil until severance of the moil takes place between the region heated by the flame and the region cooled by the blast of cooling fluid.

4. In a method of burning-off hollow glassware wherein a flame is applied to a glass work piece rotated about a substantially vertical axis at a localized region extending horizontally and circumferentially around the work piece to soften the glass in said region, and the work piece is elongated vertically during the application of the flame to stretch the softened glass and diminish the thickness thereof, the improvement which comprises applying a blast of cooling air against the softened glass of the moil in a localized region extending horizontally and circumferentially around the moil, immediately adjacent the region where the flame is applied to the work piece to cool the softened glass of the moil and increase its resistance to flow, said flame being supplied by a combustible mixture having an oxygen to fuel-gas ratio of about 0.7:1 to 0.9:1 and said cooling air being issued to flow in a plane parallel and sufficiently close to the heating flame so as to supply to the flame secondary oxygen for combustion of the combustile mixture yet so spaced therefrom a distance from one-sixteenth to about one-half inch as not to distort the flame; elongating the work piece downwardly solely by the force of gravity acting on the moil, and continuing simultaneously to apply said flame and said blast of cooling air and to elongate said work piece solely by force of gravity acting on the moil until severance of the moil takes place between the region heated by the flame and the region cooled by the blast of cooling air.

5. A process according to claim 1 wherein the flame is supplied by a combustile mixture having an oxygen to fuel-gas ratio of about 0.7:1 to 0.9:1 and the cooling blast is air issued to flow in a plane parallel and sufficiently close to the heating flame so as to supply to the flame secondary oxygen for combustion of the combustible mixture.

RAYMOND ALBERT WOLF.

REFERENCES CITED

The following references are of record in the file of this patent:

UNITED STATES PATENTS

| Number | Name | Date |
|---|---|---|
| 1,674,366 | Kadow et al. | June 19, 1928 |
| 1,719,588 | Campbell et al. | July 2, 1929 |
| 2,215,980 | Schreiber | Sept. 24, 1940 |
| 2,322,336 | Anderson | June 22, 1943 |
| 2,334,111 | McNamara et al. | Nov. 9, 1943 |

FOREIGN PATENTS

| Number | Country | Date |
|---|---|---|
| 85,234 | Germany | 1896 |